United States Patent [19]

Stieber

[11] 4,293,772

[45] Oct. 6, 1981

[54] WOBBLING DEVICE FOR A CHARGED PARTICLE ACCELERATOR

[75] Inventor: Volker A. W. Stieber, Erlangen, Fed. Rep. of Germany

[73] Assignee: Siemens Medical Laboratories, Inc., Walnut Creek, Calif.

[21] Appl. No.: 135,300

[22] Filed: Mar. 31, 1980

[51] Int. Cl.³ .................................................. G01J 1/42

[52] U.S. Cl. .............................. 250/492.2; 250/396 R

[58] Field of Search ............................ 250/492 B, 396

[56] References Cited

U.S. PATENT DOCUMENTS

| | | | |
|---|---|---|---|
| 2,820,165 | 1/1958 | Robinson | 250/492 B |
| 2,863,103 | 7/1959 | Farrell | 250/396 |
| 2,866,902 | 12/1958 | Nygard | 250/396 |
| 3,013,154 | 12/1961 | Trump | 250/492 B |
| 3,120,609 | 2/1964 | Farrell | 250/396 |
| 3,621,327 | 11/1971 | Hashmi | 250/396 |

OTHER PUBLICATIONS

Radiotherapy Today: "The Mevatron 20, . . . ," Electromedica, 3/4/77, pp. 101-106.

*Primary Examiner*—Harold A. Dixon
*Attorney, Agent, or Firm*—Spellman, Joel and Pelton

[57] ABSTRACT

A charged particle accelerator has an accelerator chamber in the interior of which a narrow beam of charged particles is accelerated. The particle beam is directed to a discharge window for discharging the particles therethrough. A device is provided for wobbling the beam of particles before the particles strike the discharge window, thereby enlarging the area where the particles strike the window. Preferably a magnetic wobbling device may be used. Such a device may have one or more magnetic coils which is/are arranged near the discharge window and which receive(s) a varying electric current. The accelerator may be a linear accelerator generating high energy electrons or X-rays for medical treatment.

9 Claims, 6 Drawing Figures

WOBBLING DEVICE FOR A CHARGED PARTICLE ACCELERATOR

BACKGROUND OF THE INVENTION

1. Field of the Invention

This invention relates to a novel and improved accelerator for charged particles. In particular, this invention relates to an accelerator which forms a narrow beam of accelerated particles in an accelerator chamber and which includes a discharge window arranged on said chamber for receiving said beam of particles at a striking location and for discharging the particles therethrough. Still more particularly, this invention relates to an electron accelerator, preferably to a linear accelerator, the accelerator chamber of which accelerates electrons until high energies are reached.

A linear accelerator can be used in a number of different applications in the field of medical treatment, such as radio therapy, radiography, and sterilization. The irradiation treatment may be carried out either by employing the accelerated electrons of high energy, or by gamma rays (hard X-rays) generated by the accelerated electrons after hitting a target.

2. Description of the Prior Art

The term "charged particle accelerator" used herein shall particularly comprise all kinds of electron accelerators that emit accelerated electrons through an electron exit window, such as betatrons and linear accelerators.

In a known type of a linear accelerator for medical purposes, an electron beam emitted from an electron source is directed in an acceleration chamber towards an electron exit window. The electron beam is pulsed and sharply focused. In the process of acceleration, the electrons attain a relatively high energy. For instance, as electron source may be used an electron gun having a tungsten cathode. The electron exit window is usually made of a thin metal foil. At the electron exit window, the electrons may have an energy of, for example, 4 MeV.

Linear accelerators of this type are, as already mentioned, mainly used for medical purposes. For example, the high energy electron beam discharged from the electron exit window may be directly employed to irradiate pathological tissue of a patient, or the high energy electron beam may be directed onto a target where it generates gamma rays (X-rays of high energy) which are applied for therapeutical treatment.

The particle exit or discharge window of particle accelerators pose special problems. That is particularly true for the electron exit window of an electron accelerator, particularly of a linear accelerator.

On the one hand, the exit window is exposed to a heavy thermal stress and strain. The impinging particle beam of high energy, in a linear accelerator the beam of accelerated electrons, has only a small diameter so that the striking location—that is, the place where the beam of particles hits the discharge window—is also small. In linear accelerators, the striking location typically may have a diameter of about 0.5 mm. Heat generated by the accelerated electrons is concentrated and the exit window may be locally overheated at the striking location. Even when water-cooling is employed, it may happen that the discharge window burns through, so that the vacuum in the interior of the particle accelerator is destroyed.

On the other hand, secondary electrons are generated at the discharge window and released into the interior of the accelerator. This is particularly true for the electron exit window of an electron accelerator. Secondary electrons have only thermal energy. However, in a linear accelerator having, for instance, a standing wave guide as the accelerator chamber or accelerator tube, secondary electrons may be accelerated in the backward direction along the central axis of the accelerator tube towards the electron source. At the electron source, they may arrive with the same high energy, to which the forward-directed electrons are accelerated, e.g. about 4 MeV. Under the effect of these high energy electrons, the electron source, for instance, the above-mentioned tungsten cathode, will emit gamma radiation (X-rays of high energy). This gamma radiation, the so-called leakage radiation, will also be directed backwards. The operator(s) of the particle accelerator must clearly be protected from this leakage radiation. This makes necessary special screening devices, which usually require some additional expenditure. The costs are high and sufficient space is sometimes unavailable.

SUMMARY OF THE INVENTION

1. Objects

An object of this invention is to provide a charged particle accelerator having improved properties with regard to its discharge window.

Another object of this invention is to provide a charged particle accelerator in which the thermal stress and strain of the discharge window is decreased. Particularly, the hazard of burning through of the discharge window shall be decreased, so that the vacuum within the accelerator chamber may be maintained for a long time.

Another object of the invention is to provide a discharge window of a charged particle accelerator with improved cooling properties without affecting the discharge window per se. It should be easily possible to obtain the improved cooling properties also at accelerators which are already installed.

Another object of the invention is to obtain an electron accelerator, particularly a linear accelerator, in which the leakage radiation is decreased.

Another object of the invention is to decrease the cost and space requirements of a particle accelerator with regard to the screening device protecting the operator from leakage radiation.

Still other objects will become apparent in the course of the following description.

2. Summary of the Invention

The above-mentioned objects are attained, according to this invention, by providing a charged particle accelerator which includes:

(a) an accelerator chamber;

(b) a system arranged within the chamber for accelerating a narrow beam of charged particles;

(c) a discharge window disposed on a wall of the chamber for receiving the beam of particles at a striking location and for discharging the particles therethrough; and (d) a device for wobbling the beam of particles before the particles strike the discharge window, so as to enlarge the striking location.

The basic idea of the invention is, therefore, to wobble the beam of charged particles before the particles strike the discharge window. This is done by repetitively changing the momentary striking location on the discharge window. By this measure, the effective striking location is enlarged, the accelerated particles will distribute their impingement energy over a greater area, and the thermal charge per plane unit of the window is reduced.

In principal, the wobbling device may be adapted for wobbling, oscillating, or scanning the beam of particles linearly on the discharge window. In other words, the momentary striking area of the impinging beam of prticles may be linearly moved to and fro on the window under the influence of the wobbling device.

It may be of greater advantage, however, to make the momentary impinging area or striking location move around non-linearly on the surface of the exit window. Thereby, for instance, an enlargement of the diameter of the effective striking area from 0.5 mm to 2 mm may easily be obtained. Preferably, the striking location may be moved circularly on the discharge window.

The wobbling device may operate mechanically or electrostatically to vary the striking location of the beam. Preferably, however, the wobbling device comprises means for generating a varying magnetic field in the vicinity of the striking location. The magnetic field thus will wobble the electron beam.

The magnetic wobbling device may comprise at least one magnetic coil which should be arranged near to the discharge window and which should be adapted to receive a varying electric current. The electric current may be either a current of one polarity and changing strength or a current of varying polarity.

A linear motion may be performed periodically. It can be caused by two or only by a single magnetic coil, which are/is arranged on the linear accelerator close to the exit window. In such an embodiment, the axis of the coil should be aligned perpendicularly with regard to the central beam axis of the accelerated particles.

A rotating movement of the striking location may be obtained by three coils which are arranged 120 degrees apart from each other on the circumference of the particle accelerator close to the exit window. The three coils may be supplied by a three phase current. It is of advantage to arrange each of the axes of the coils perpendicularly to the central particle beam.

In a linear accelerator, the frequency of oscillating, scanning or circulating the stream of particles should be somewhat lower than the pulse frequency with which the electron beam pulses impinge on the electron exit window. If, for example, 300 pulses per second are directed to the exit window in a linear accelerator, then the arrangement of the coil or coils may be supplied with the mains frequency; i.e., with 50 or 60 Hz.

The effect of magnetic wobbling on the electrons of a linear accelerator having a standing wave guide is this: The varying magnetic field has a component which is perpendicular to the direction of the accelerated electrons. The electrons will be bended perpendicularly to the mentioned magnetic field component and perpendicularly to their direction of travel. Wobbling of the beam of particles leads to an enlargement of the striking location on the electron exit window. Enlarging the striking location, for instance from 0.5 to 2 millimeters diameter, results in a smaller heat and power density, so that the thermal charge of the exit window (a thin metal foil) will be decreased. Simultaneously there will also be an enlargement of the cone of the low energy (thermal) electrons which are generated in the exit window and which are directed backwards into the interior of the wave guide. Wobbling by the additional magnetic field component has only a small effect on the high energy primary electrons (for instance, 4 MeV), however, a considerable diverting effect on the secondary electrons of low energy. These secondary electrons will therefore be emitted backwards at a greater angle with respect to the central beam axis. Thereby, the probability is reduced that these secondary electrons will be emitted along the central axis and therefore accelerated backwards. A smaller number of electrons accelerated in the backwards direction leads to a decrease of unwanted gamma radiation which is emitted by the electron source. This leakage radiation is also directed backwards. Due to the decrease of the unwanted gamma leakage radiation, the expenditures with regard to screening at the location of the electron source can be kept within reasonable limits.

It should be pointed out that moving figures other than a linear line, a circle or an ellipse can be chosen at the moving striking location on the discharge window. For instance, a combination of these figures can be chosen. Also various other symmetrical or unsymmetrical figures can be applied. Important is that a movement of the momentary striking location will take place, which will result in a reduced power density on the window and in a reduced amount of electrons which are accelerated in the backward direction.

BRIEF DESCRIPTION OF THE DRAWINGS

The foregoing and other objects, features and advantages of the invention will be apparent from the following more particular description of a preferred embodiment of the invention as illustrated in the accompanying drawings.

In the drawings.

DESCRIPTION OF THE PREFERRED EMBODIMENT

Figure 1:
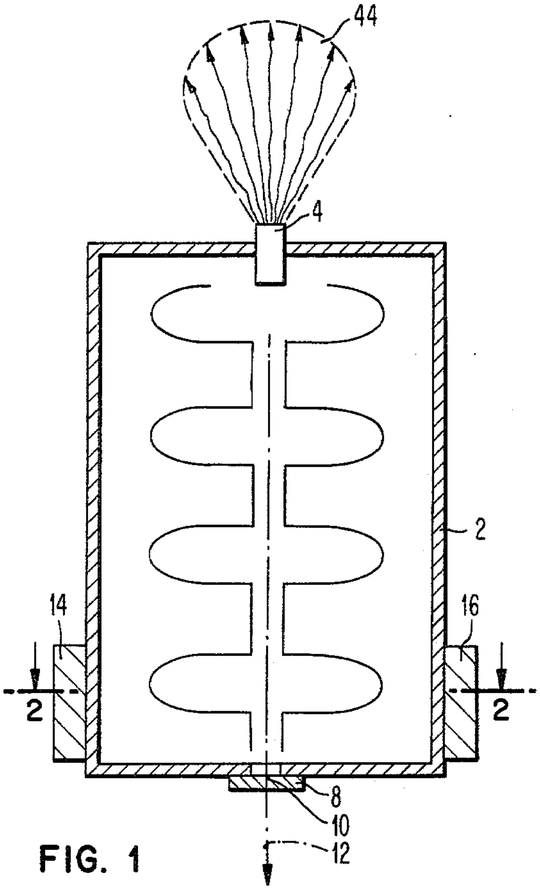
FIG. 1 is a sectional view of a linear accelerator incorporating the invention.
Figure 2:
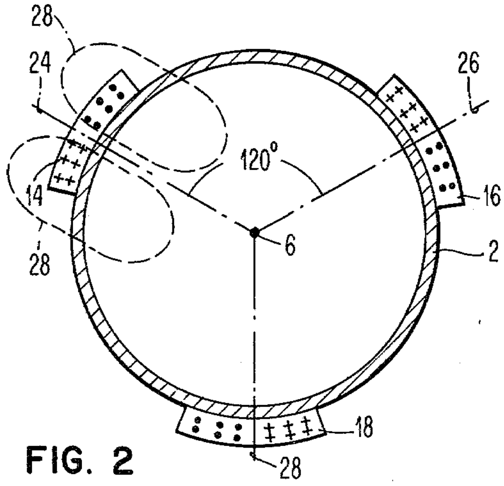
FIG. 2 is a view along direction II—II of FIG. 1.

With reference to FIGS. 1 and 2, a linear accelerator for medical treatment is shown having a conventional accelerator chamber or wave guide 2 and a particle source 4. The wave guide 2 is determined for accelerating negatively charged particles, i.e. for accelerating electrons. The particle source 4, which is referred to as an electron gun, is provided for emitting and injecting electrons into the injecting end of the wave guide 2.

The wave guide 2 may consist of a hollow tube into which is introduced an electromagnetic wave from a suitable high frequency source (not shown) via a coupling or introducing element (not shown) and an input window (not shown). Instead of a so-called travelling wave guide, a standing wave guide can be used. As can be seen from FIG. 1, a wave guide 2 of the known type "Los Alamos" can be employed. The wave guide 2 may have approximately a cylindrical shape and a linear main axis 6. The interior of the wave guide 2 is evacuated. The wall of the wave guide 2 consists of a non-ferromagnetic material, such as copper. Also other materials, especially metals, may be used which can be penetrated by a magnetic field.

Electrons introduced into the wave guide 2 are accelerated along the central axis 6. They will obtain a high energy by virtue of electromagnetic waves provided inside the wave guide 2. The moving direction of the electrons coincides with the main axis 6. A pulsed beam of electrons impinges perpendicularly on an electron exit window 8, which is located at the delivery end of the wave guide 2. The exit window 8 conventionally consists of a thin metal foil. It separates the evacuated interior of the wave guide 2 from the exterior. The exit window 8 is located on the wall at the delivery end of the wave guide 2.

The beam of accelerated electrons hitting the exit window 8 has only a small diameter. The beam hits the window 8 at a striking location 10 which is illustrated in more detail in FIGS. 3 and 4. The area of the striking location 10 is very small. In the stationary position its diameter may be only 0.5 millimeters.

The accelerated electrons leave the wave guide 2 through the window 8 as an output beam 12. The electrons have a high energy, for instance 4 MeV. A collimator (not shown) is usually added to the output side of the wave guide 2. The output beam 12 may be directed onto a target (not shown) to generate X-ray pulses. Either the output beam 12 of high energy electrons or the X-rays from the target are employed for radiation treatment of a patient.

Figure 3:
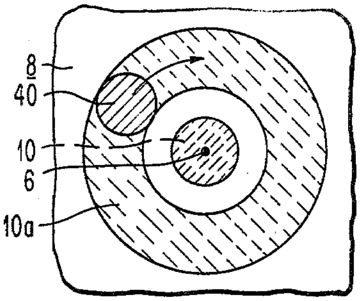
FIG. 3 shows the movement of the striking location of a primary electron beam on the exit window along a circle.
Figure 4:
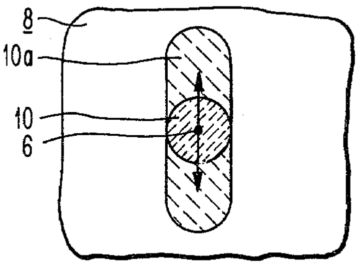
FIG. 4 shows the movement of such a striking location along a linear line.

According to FIGS. 1 and 2, there is provided a magnetic wobbling device for wobbling the beam of electrons travelling along the central axis 6 just before the electrons strike the window 8. The effect of such a wobbling device is to enlarge the effective striking location 10. In FIGS. 3 and 4, the enlarged striking location is referred to as 10*a*.

As can be seen from FIGS. 1 and 2, the magnetic wobbling device contains three magnetic coils 14, 16 and 18. For generating a variable magnetic field in the vicinity of the striking location 10, these magnetic coils 14, 16 and 18 are arranged on the outside of the wave guide 2 near to the discharge window 8. The magnetic coils 14, 16 and 18 are arranged 120° apart from each other with respect to the central axis 6 and thus with respect to the beam of accelerated particles. Each coil 14, 16 and 18 has a coil axes 24, 26 and 28, respectively, which is arranged perpendicularly to the direction of the electron beam. The three coil axes 24, 26 and 28 meet together in a common point, which is located on the central axis 6.

Figure 5:
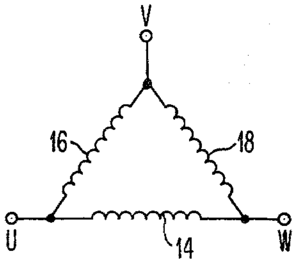
FIG. 5 is an electric arrangement of three magnetic coils determined for wobbling an electron beam.

The magnetic coils 14, 16 and 18 are adapted for connection to an electric source of changing polarity. This source can be formed by a commonly used three phase current supply U, V, W, as indicated in FIG. 5. Also other sources for generating a varying electric current can be used. When currents flow through the coils 14, 16 and 18, they each will generate magnetic fields with a component prependicular to the central axis 6. The magnetic field of the coil 14 is designated as 28 in FIG. 2.

The coils 14, 16 and 18 may be electrically delta or star connected to the supplying three phase current supply U, V, W. As shown in FIG. 5, the delta connection is preferred.

As can be seen from FIG. 2, the magnetic coils 14, 16 and 18 have curved portions resting on the outside of the wave guide 2. The shape of these coil portions matches closely the shape of the cylindrical wall of the wave guide 2. Thus, a good contact and a direct magnetic influence on the electron beam are achieved. The coils 14, 16 and 18 are preferably air coils, and their winding bodies may be shaped accordingly.

By aid of the magnetic coils 14, 16 and 18 a revolving magnetic field component is generated. In other words, the field component which results from the magnetic fields of the three coils 14, 16 and 18 and which is arranged perpendicularly to the central axis 6, will circulate around said central axis 6.

It shall first be assumed that all coils 14, 16 and 18 have the same dimensions and that they are all connected to a three-phase current supply U, V, W of symmetrical voltages. Then the beam of particles will be wobbled circularly on the discharge window 8. This is shown in FIG. 3, where 10 denotes the stationary striking location and 10*a* the moving path of the striking location when the coils are in operation.

If only one of the coils 14, 16 18 is operating, a linear motion of the striking location will result, see FIG. 4.

In deviation from the representation in FIGS. 1 and 2, it shall now be assumed that the magnetic coils 14, 16 and 18 have different sizes, for instance, a different number of windings and/or a different diameter. The reason for the different sizes may be that there are space problems to arrange a coil of the necessary size on the outer wall of the wave guide 2. To obtain even in such a case three magnetic field components which are equal to each other, there may be connected one or more matching transformers between the current supply U, V, W and the ends of the coils 14, 16 and 18. The dimensions of such a matching transformer should be chosen correspondingly.

Figure 6:
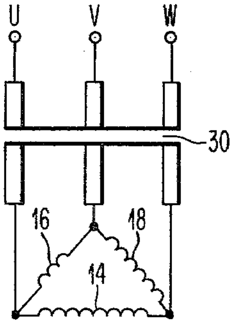
FIG. 6 is an electrical arrangement of three magnetic coils supplied from a mains supply via matching transformers.

A matching transformer 30 in star-star-connection is shown in FIG. 6. It serves to match the coil currents to the different winding numbers and/or winding diameters. By such a matching transformer 30 it can be achieved that the magnetic fields of the magnetic coils 14, 16 and 18 of different size are substantially the same. In particular, in FIG. 6, the magnetic coil 16 has a smaller size than the remaining coils 14 and 18. The transformer 30 is a step-up transformer which supplies a higher voltage for coil 16 than for coils 14 and 18. The transformer 30 is connected between the three-phase current supply U, V, W and the coil arrangement.

It should also be mentioned that the current source for supplying the magnetic coils 14, 16 and 18 may be an alternating current supply having mains frequency.

From FIG. 4 can be seen that the electron beam, which is emitted along the central axis 6 with high energy, will hit the exit window 8 in a circular striking location 10 which is stationary when the magnetic coils 14, 16 and 18 are not effective. Connecting these coils 14, 16 and 18 to a three-phase current supply U, V, W generates a circulating component of the magnetic field which is aligned perpendicularly to the central axis 6. This field component penetrates the wave guide wall material and affects the beam of primary electrons. Under the effect of this magnetic field component the striking location 10 is relocated from its stationary location to a position 14 which moves along a Lissajou figure. This Lissajou figure is in the chosen example a circle. When an impulse rate of 300 electron impulses per second is chosen, then mains frequency, that is 50 or 60 Hz, can be employed for the supply of the magnetic coils 14, 16 and 18. Then the location 14 will circle around 50 or 60 times a second, respectively, and with each circle 6 or 5 electron pulses will hit sequentially the electron exit window 8. From FIG. 4 can be seen that due to the circulation, the impinging thermal energy will distribute on a greater area than in the case without magnetic coils 14, 16 and 18 operating. The total diameter may be enlarged, for instance, from 0.5 to 2 millimeters. Therefore, the hazard of burning through is decreased.

The primary electrons of about 4 MeV are only slightly bended by the circulating magnetic field since their energies are relatively high. On the impinging and passing through the exit window 8, secondary electrons of low (thermal) energy are generated which are directed backwards. Without the coils 14, 16 and 18 being effective, a great number of these secondary electrons would be accelerated along the central axis 6 in the direction of the electron source 4. They also may attain an energy of about 4 MeV and generate gamma rays on the tungsten cathode of the electron gun 4. This is shown by a radiation club 44. However, when the coils 14, 16 and 18 are effective, the electrons of low energy are also exposed to the circulating magnet field component. Due to their low energy they will be deviated out of their original direction towards the interior wall of the wave guide 2. By this effect the probability that they will be accelerated in the backwards direction along the central axis 6 is considerably decreased. Therefore, the number of electrons hitting the electron gun 4 and the number of gamma particles originating therefrom have decreased. The cost of a screening device (not shown) may be reduced.

The electron beam 12 emitted from the exit window 8 in forward direction may be used directly or indirectly for therapeutical purposes, as already mentioned earlier.

There has thus been shown and described a novel wobbling device for a charged particle accelerator which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. A linear accelerator for medical treatment comprising, in combination:

(a) an accelerator chamber including wall means made of a non-ferromagnetic material;

(b) means arranged in said chamber for accelerating a narrow beam of electrons in a forward direction therethrough, said electrons forming beam pulses having a predetermined pulse frequency;

(c) a discharge window disposed on said chamber for receiving said beam of electrons at a striking location and for discharging said electrons therethrough; and (d) means for wobbling said beam of electrons before the electrons strike said discharge window, wherein said wobbling means comprises three magnetic coils which are arranged 120° apart from each other around said beam of electrons on the outside of said wall means near said discharge window, said three magnetic coils being adapted for connection to a three-phase current supply having a predetermined supply frequency, said supply frequency being lower than said pulse frequency of said electron beam pulses, said coils thereby being provided for generating a magnetic field in the vicinity of said striking location near said discharge window, which magnetic field causes said electrons to impinge on said discharge window in a circular path, thereby enlarging said striking location and reducing the number of secondary electrons being accelerated in a backward direction through said accelerator chamber.

2. The particle accelerator according to claim 1, wherein said accelerator chamber is at least approximately of cylindrical shape and has a main axis, and wherein the direction of said beam of electrons coincides with said main axis.

3. The particle accelerator according to claim 1, wherein said accelerator chamber is made of a non-ferromagnetic metal.

4. The particle accelerator according to claim 1, wherein said coils are delta-connected.

5. The particle accelerator according to claim 1, wherein at least one of said three magnetic coils has a size which is different from the sizes of the remaining coils, and wherein said particle accelerator further comprises matching transformer means connected to at least one of said coils for supplying a matching current thereto, whereby the magnetic fields of said coils are substantially the same.

6. The particle accelerator according to claim 5, wherein one magnetic coil has a smaller size than the remaining coils, wherein said transformer is a step-up transformer, and wherein said step-up transformer and the remaining coils are adapted to be connected to a three-phase current supply.

7. The particle accelerator according to claim 1, wherein said coils are connected to a three-phase current supply having the mains frequency.

8. The particle accelerator according to claim 1, wherein each of said magnetic coils has a portion resting on the outside of said wall means, and wherein the shape of said coil portion matches the shape of said wall means.

9. The particle accelerator according to claim 1, wherein each of said magnetic coils has a coil axis which is arranged perpendicularly to the direction of said beam of electrons and wherein said three coil axes intersect at one point.

* * * * *